(12) United States Patent
Tokunaga

(10) Patent No.: US 6,389,694 B1
(45) Date of Patent: May 21, 2002

(54) METHOD OF MANUFACTURING METAL CARRIER USABLE FOR EXHAUST GAS PURIFYING CATALYST

(75) Inventor: Yoshikuni Tokunaga, Chita (JP)

(73) Assignee: Nagoya University, Aichi Pref. (JP)

( * ) Notice: Subject to any disclaimer, the term of this patent is extended or adjusted under 35 U.S.C. 154(b) by 0 days.

(21) Appl. No.: 09/537,470

(22) Filed: Mar. 24, 2000

(30) Foreign Application Priority Data

Mar. 26, 1999 (JP) .......................................... 11-083380

(51) Int. Cl.⁷ ................................................ B23P 15/00
(52) U.S. Cl. .......................................... 29/890; 29/428
(58) Field of Search .................. 29/890, 428; 422/171, 422/177, 180

(56) References Cited

U.S. PATENT DOCUMENTS

| | | | | |
|---|---|---|---|---|
| 4,098,722 A | * | 7/1978 | Cairns et al. ................. | 29/890 |
| 4,318,888 A | * | 3/1982 | Chapman et al. ........... | 422/180 |
| 4,382,323 A | * | 5/1983 | Chapman et al. ........... | 422/180 |
| 5,437,099 A | * | 8/1995 | Retallick et al. .............. | 29/890 |
| 5,460,790 A | * | 10/1995 | Shustorovich et al. ...... | 422/177 |
| 5,648,050 A | * | 7/1997 | Matsumoto et al. ......... | 422/180 |
| 5,658,536 A | * | 8/1997 | Okabe et al. ................ | 422/180 |
| 5,729,902 A | * | 3/1998 | Wieres et al. .................. | 29/890 |
| 5,791,044 A | * | 8/1998 | Whittenberger et al. ...... | 29/890 |
| 5,824,202 A | * | 10/1998 | Fabian et al. .................. | 29/890 |

FOREIGN PATENT DOCUMENTS

| | | |
|---|---|---|
| JP | 1-317635 | 12/1989 |
| JP | 3-161024 | 7/1991 |
| JP | 5-200303 | 8/1993 |
| JP | 5-309277 | 11/1993 |
| JP | 9-117639 | 5/1997 |

* cited by examiner

Primary Examiner—Irene Cuda-Rosenbaum
(74) Attorney, Agent, or Firm—Knobbe, Martens, Olson & Bear, LLP

(57) ABSTRACT

A method for manufacturing a metal carrier usable for an exhaust gas purifying catalyst, by spirally winding a blank material into the form of metal carrier. In the method according to the invention, two to four sheets of flat metal foils are provided, having projections and holes over entire surfaces thereof, as the metal carrier blank material. The flat metal foils are spirally wound under a mutually overlapped state, into a form of cylindrical body, and the tip ends of the projections are joined to corresponding surfaces of the flat metal foils.

10 Claims, 4 Drawing Sheets

METHOD OF MANUFACTURING METAL CARRIER USABLE FOR EXHAUST GAS PURIFYING CATALYST

BACKGROUND OF THE INVENTION

1. Field of the Invention

The present invention relates to a method for manufacturing a metal carrier of a catalytic converter to be used for an exhaust gas purifying device of internal combustion engine.

2. Related Art Statement

Conventionally, it has been practiced to manufacture a metal carrier of a catalytic converter to be used for an exhaust gas purifying device of internal combustion engine, by alternatively overlapping a pair of flat metal foil 2 and wavy metal foil 3 such as made of heat-resistant stainless steel, spirally winding them in this state, and joining respective top portions of waves of the wavy metal foil 3 to a corresponding surface of the flat metal foil 2 such as by brazing, as shown by a reference numeral 1 in FIG. 1.

The thus manufactured catalyst carrier 1 made of metal has a number of exhaust gas passages defined by the flat metal foil 2 and wavy metal foil 3. As shown in FIG. 2, wash coat liquid 4 is applied onto the surfaces of the exhaust gas passages with dipping, and then dried. Thereafter, catalyst is carried on the surfaces of the wash coat liquid 4 to thereby manufacture an exhaust gas purifying catalyst.

Once the exhaust gas gets into the exhaust gas passages of the exhaust gas purifying catalyst, reaction target substance within exhaust gas moves to a surface of the catalyst due to diffusion so that a predetermined chemical reaction progresses. As a result, generated substance moves from the catalyst into the exhaust gas, and is then discharged into the atmosphere.

Thus, exhaust gas purifying rate or speed is limited by: a transfer rate of the reaction target substance onto a catalyst surface; a chemical reaction rate at the catalyst surface; and a transfer rate of a generated substance from the catalyst surface. If the exhaust gas purifying rate is fast, the exhaust gas purifying catalyst may have a short length, and if the exhaust gas purifying late is slow, it is necessary to provide an exhaust gas purifying catalyst having a length sufficient for purifying a harmful substance within exhaust gas.

(1) It is a matter of course that an exhaust gas purifying catalyst preferably to have a higher reaction efficiency and having a shorter axial length is preferable.

On the other hand, in addition to the aforementioned demand, exhaust gas purifying catalyst is preferable to satisfy the following conditions.

(2) It is said that, in an automobile in which an exhaust gas purifying catalyst is used, a ratio of harmful exhaust substance to be discharged just after starting of engine, in relation to an entire quantity of harmful exhaust substance, is 50% or more. Therefore, it is extremely important that a temperature rising rate of exhaust gas purifying catalyst just after starting of engine is high so as to contribute to removal of harmful exhaust substance.

By the way, commonly used platinum based catalyst normally functions at a temperature of 350° C. or higher. It is accordingly preferable that an exhaust gas purifying catalyst reaches this activating temperature as soon as possible after starting of engine.

Meanwhile, as previously described in relation to FIG. 1, in a conventional exhaust gas purifying catalyst, catalyst carrier 1 has a structure having overlapped flat metal foil 2 and wavy metal foil 3. Therefore, as shown by α in FIG. 2, it is impossible to avoid occurrence of surfaces intersecting with each other at an acute angle interiorly of the exhaust gas passage.

It is also impossible to avoid that an unnecessarily large amount of wash coat liquid 4 is coated between the surfaces intersecting with each other at an acute angle (α) within the exhaust gas passage, since the wash coat liquid 4 is coated onto an inner surface of the exhaust gas passage by a dipping method as described above so that the wash coat liquid 4 concentrates to the aforementioned area due to a surface tension.

As such, in the conventional catalyst carrier 1 for an exhaust gas purifying catalyst, in addition to a problem of cost increase due to adhesion of excessive amount of wash coat liquid, there have been caused such problems that:

Deterioration of catalyst reaction efficiency due to reduction of catalyst carrying surface area inevitably leads to a long and large exhaust gas purifying catalyst, so that the aforementioned demand (1) is not satisfied; and Increase of heat capacity due to adhesion of excessive amount of wash coat liquid prolongs a time required for temperature rise up to the activating temperature of exhaust gas purifying catalyst after starting of engine, so that the aforementioned demand (2) is not fully satisfied.

Further, it has been also confirmed that the following problems are caused in the conventional catalyst carrier 1 for exhaust gas purifying catalyst.

Namely, flow rate of exhaust gas entering the catalyst carrier 1 is not uniform. Generally, high speed exhaust gas flows such as from an exhaust pipe having a diameter of about 60 mm or less into the catalyst carrier 1 having a diameter of approximately 100 mm, so that the flow rate is high at a center portion and low at a peripheral portion of the catalyst carrier 1.

At the center portion of catalyst carrier 1 at which the flow rate is high, temperature of wall surface rises within a short period of time just after starting of engine. However, at the peripheral portion of catalyst carrier 1 at which the flow rate is low, wall surface does not reach an activating temperature unless a considerable period of time has passed after starting of engine, resulting in that the temperature elevation of wall surface just after starting of engine is delayed during which unpurified harmful substance continues to flow out.

To solve the aforementioned problems, as described in Japanese Patent Application Opened No. 309277/93, there has been proposed a countermeasure to penetratingly form a number of holes in a flat metal foil and a wavy metal foil so as to diffuse the exhaust gas in a radial direction within the carrier.

However, in case of penetratingly forming a number of holes newly in the flat metal foil and wavy metal foil, it is required to provide another process for forming the holes, leading to increase of cost. Among other things, it has been confirmed that the degree of performance improvement of the peripheral portion of carrier is low relative to the increased cost, thus this is not practical.

It was pointed out in the above that the heat capacity of the conventional catalyst carrier 1 is one of the reasons which make the delay of the temperature rise of catalyst after starting of engine. In addition, a low heat transfer rate from exhaust gas to wall surface of carrier is the other reason which makes the delay of the temperature rise of catalyst.

Considering here a heat transfer rate of exhaust gas to a wall surface of carrier, it is apparent that: the shorter the distance between the exhaust gas and the catalyst surface, the shorter the period of time required that all of reactants reach the catalyst surface and are substituted by reaction products by transference of reactants within the exhaust gas passage.

To shorten the distance between exhaust gas and catalyst surface, it is sufficient to reduce a cross sectional area of the exhaust gas passage insofar as the cross sectional shapes are identical. Further, concerning a cross sectional shape of exhaust gas passage, the object of interest is achieved by flattening the cross sectional shape to thereby shorten a distance between opposing wall surfaces of exhaust gas passage.

Concerning the latter cross sectional shape of exhaust gas passage, in "Analytical Investigation of the Performance of Catalytic Monoliths of Varying Channel Geometries Based on Mass Transfer Controlling Conditions", Society of Automotive Engineers, Automotive Engineers Congress, Feb. 25, 1974, there has been presented a calculation result obtained by: successively changing a cross sectional shape of exhaust gas passage such as into triangular, circular, square, rectangular shape; calculating a reaction rate within the exhaust gas passage; and thereby obtaining such as a length of exhaust gas purifying catalyst required for completing the reaction, and pressure loss due to passing through carrier.

According thereto, it has been clarified that the most superior mass transfer rate is presented by a rectangular cross sectional shape of exhaust gas passage having an aspect ratio of about 4 or more.

Heat transfer from exhaust gas to a catalyst wall surface is performed through collision of exhaust gas molecule with the catalyst wall surface. As such, there can be generally found a positive correlation between a mass transfer rate from exhaust gas to catalyst wall surface and a heat transfer rate. Thus, by selecting a cross sectional shape the mass transfer rate is high to thereby promote a catalyst reaction, the heat transfer rate is necessarily improved. By rendering the cross sectional shape of exhaust gas passage to be a rectangle having an aspect ratio of about 4 or more as described above, there can be expected the fastest temperature rise of catalyst, and there can be effectively promoted a temperature rise of catalyst after starting of engine.

Contrary, as clearly shown in FIG. 2, in the conventional metal carrier, the exhaust gas passage has nearly a triangular cross sectional shape which presents an inferior heat transfer rate from exhaust gas to the wall surface of carrier, also resulting in delay of temperature rise of catalyst.

SUMMARY OF THE INVENTION

It is therefore an object of the present invention, in stead of manufacturing a metal carrier for an exhaust gas purifying catalyst by overlapping a flat metal foil and wavy metal foil in view of the aforementioned actual situation, to manufacture a catalyst carrier basically by laminating flat metal foils only so as to form an exhaust gas passage by separating flat metal foils with projections provided in flat metal foils by a predetermined distance, and so as to render the flat metal foils to be hole opened such that exhaust gas is allowed to flow also in a radial direction, to thereby propose a manufacturing method of a metal carrier usable for an exhaust gas purifying catalyst adapted to fully solve the aforementioned problems.

It is another object of the present invention to propose a manufacturing method of a metal carrier usable for an exhaust gas purifying catalyst in which joining strength between flat metal foils is increased.

It is another object of the present invention to propose a manufacturing method of a metal carrier usable for an exhaust gas purifying catalyst in which strength at an exhaust gas inflow side portion is increased.

It is another object of the present invention to propose a manufacturing method of a metal carrier usable for an exhaust gas purifying catalyst in which the projections and holes to be provided at the flat metal foil are simultaneously and readily formed without accompanying weight increase.

It is another object of the present invention to propose a manufacturing method of a metal carrier usable for an exhaust gas purifying catalyst in which the formation of the projections and holes according to the fourth invention can be performed such that wrinkles are not caused in the flat metal foils.

It is another object of the present invention to propose a manufacturing method of a metal carrier usable for an exhaust gas purifying catalyst in which the projections do not give a resistance so large as to be problematic to an exhaust gas flow, nor cause an inconvenience for a spiral winding operation of the flat metal foils.

It is another object of the present invention to propose a manufacturing method of a metal carrier usable for an exhaust gas purifying catalyst in which the projections do not cause a spring back when the projections are formed by stamping.

It is another object of the present invention to propose a manufacturing method of a metal carrier usable for an exhaust gas purifying catalyst in which shearing stresses acting on the punch for stamping the flat metal foil are compensated with each other, when the projections are formed by stamping.

It is another object of the present invention to propose a manufacturing method of a metal carrier usable for an exhaust gas purifying catalyst in which there is avoided such a situation that the projections align with the holes when the flat metal foils are overlapped with each other so that the projections fail to maintain the spacing between the flat metal foils in a predetermined manner.

First of all, for the aforementioned objects, the present invention provides a method for manufacturing a metal carrier usable for an exhaust gas purifying catalyst, by spirally winding a blank material into the form of metal carrier. The method according to the invention comprises the steps of: providing two to four sheets of flat metal foils having projections and holes over entire surfaces thereof, as the metal carrier blank material; spirally winding the flat metal foils under a mutually overlapped state, into a form of cylindrical body; and joining tip ends of the projections to corresponding surfaces of the flat metal foils.

In the present invention, two to four sheets of flat metal foils having projections and holes over entire surfaces thereof are spirally wound under a mutually overlapped state, into a form of cylindrical body; and tip ends of the projections are joined to surfaces of the flat metal foils; to thereby manufacture a metal carrier usable for an exhaust gas purifying catalyst.

The thus manufactured carrier of exhaust gas purifying catalyst defines an exhaust gas passage between flat metal foils which are neighboring in a radial direction with a spacing therebetween being defined by the projections. As such, the exhaust gas passage has a cross sectional shape resembling a rectangle, and the height of the projections can be arbitrarily selected, so that it is also possible to render the rectangle to be one having an aspect ratio of 4 or more by which there can be expected the fastest temperature rise as described above. Thus, there can be manufactured a carrier of exhaust gas purifying catalyst capable of effectively promoting temperature rise of catalyst after starting of engine.

Further, the carrier of exhaust gas purifying catalyst manufactured in the manner of the first invention defines the exhaust gas passage as described above, and such that the projections only to define the spacing between flat metal foils, so that the protruding angle of projection relative to the flat metal foil can be arbitrarily settled, resulting in that it becomes possible to readily avoid occurrence of surfaces intersecting with an inner surface of the exhaust gas passage at an acute angle, thereby exiling occurrence of a problem that an unnecessarily large amount of wash coat liquid is coated onto a particular portion due to a surface tension, at the time of application of wash coat liquid onto the inner surface of the exhaust gas passage.

In this way, it becomes also possible to avoid cost increase due to adhesion of an excessive amount of wash coat liquid, and to avoid such a problem that deterioration of catalyst reaction efficiency due to reduction of catalyst carrying surface area leads to a long exhaust gas purifying catalyst.

In addition, there is not caused increase of heat capacity due to adhesion of excessive amount of wash coat liquid, so that there is not required a prolonged period of time for temperature rise up to the activating temperature of exhaust gas purifying catalyst after starting of engine. Further, there can be also avoided such a problem that the temperature rise of wall surface of exhaust gas passage just after starting of engine is delayed so that unpurified harmful substance continues to outflow.

In the carrier of exhaust gas purifying catalyst as manufactured in the first invention, the holes exist over entire surfaces of the flat metal foils, thereby enabling diffusion of exhaust gas in a radial direction from a carrier center portion where a flow rate of exhaust gas becomes large toward a carrier peripheral portion where a flow rate of exhaust gas becomes small. Thus, at the carrier peripheral portion where the temperature rise tends to delay, there is promoted the temperature rise to thereby enhance an exhaust gas purifying efficiency.

Advantageously, the tip ends of the projections of the flat metal foils are bent to extend along surfaces of the flat metal foils to which the tip ends of the projections are joined, and the each projections are joined to the each flat metal foils at the bent tip ends.

In this case, the joining areas between the projections and the flat metal foil are widened, thereby allowing enhancement of the joining strength between flat metal foils.

Advantageously, the width of one flat metal foil of the two to four sheets of flat metal foils is rendered to be identical with an axial length of the metal carrier after completion, widths of the remaining flat metal foils are rendered to be shorter by a range between 5 mm and 40 mm at the exhaust gas inflow side portion than the axial length of the metal carrier after completion, and the exhaust gas inflow side portion of the one sheet of flat metal foil in the above range is rendered to be a flat shape where no projections exist, a wavy metal foil having a width just for compensating the exhaust gas inflow side portions of the remaining flat metal foils, is overlapped with the exhaust gas inflow side portion of the one sheet of flat metal foil, and the spirally winding is performed under this state, and under this wound state, both sides of top portions of the wavy metal foil are joined to corresponding surfaces of the one sheet of flat metal foil, to thereby manufacture a metal carrier of an exhaust gas purifying catalyst.

In this case, the radially opposing portions of the flat metal foils forming the carrier of exhaust gas purifying catalyst are interconnected with each other at the exhaust gas inflow side portion by the wavy foils 20, instead of the aforementioned projections, so that the strength of the catalyst carrier at the exhaust gas inflow side portion can be enhanced.

Advantageously, the holes are formed by stamping the flat metal foils, and simultaneously therewith, those stamped and unsheared pieces protruded from the flat metal foils by the stamping are rendered to be the projections.

In this case, the holes are automatically formed upon forming the projections, resulting in unnecessity of providing another process for opening holes even if the holes are to be penetratingly formed for the aforementioned object, to thereby restrict cost increase, and weight increase is not introduced even when the projections are provided since the projections are parts of the material of the flat metal foil.

Advantageously, the stamping is performed by a punch after fixing the flat metal foil between a pressing plate and the die.

In this case, the formation according to the fourth invention can be performed in a manner that no wrinkles are caused in the flat metal foil, to thereby improve the quality of the catalyst carrier.

Advantageously, the projections are formed such that the merging portions between the projections and the flat metal foils are directed in a direction parallel to an axis of the metal carrier after completion or inclined within an inclination angle of 30°.

In this case, the projections do not give a resistance so large as to be problematic to an exhaust gas flow, nor cause an inconvenience for a spiral winding operation of the flat metal foils.

Advantageously, the projections are formed such that the merging portions between the projections and the flat metal foils are curved at a radius of curvature which is 0.7 to 50 times a length of each of the merging portions.

In this case, the projections do not cause a spring back when the projections are formed by stamping, thereby avoiding a problem that the spacing between flat metal foils deviates from what is predetermined, due to the spring back.

Advantageously, those paired projections and holes in the same raw aligning in a winding direction of the flat metal foils are formed such that the positions of merging portions between the projections and the flat metal foils are set at mutually farther hole side positions of the holes.

In this case, shearing stresses acting on the punch for stamping the flat metal foil are compensated with each other, when the projections are formed by stamping, resulting in that the lateral forces acting on the entire mold can be fully nullified.

Advantageously, the projections and holes are formed such that arranging patterns of the projections and holes are different from each other between neighboring flat metal foils, to thereby avoid such a situation that the projections align with the holes when the flat metal foils are overlapped with each other, thereby solving such a problem that the projections fail to maintain the spacing between the flat metal foils in a predetermined manner.

DETAILED DESCRIPTION OF THE INVENTION

There will be described hereinafter the embodiments of this invention in accordance with the drawings.

Figure 1:
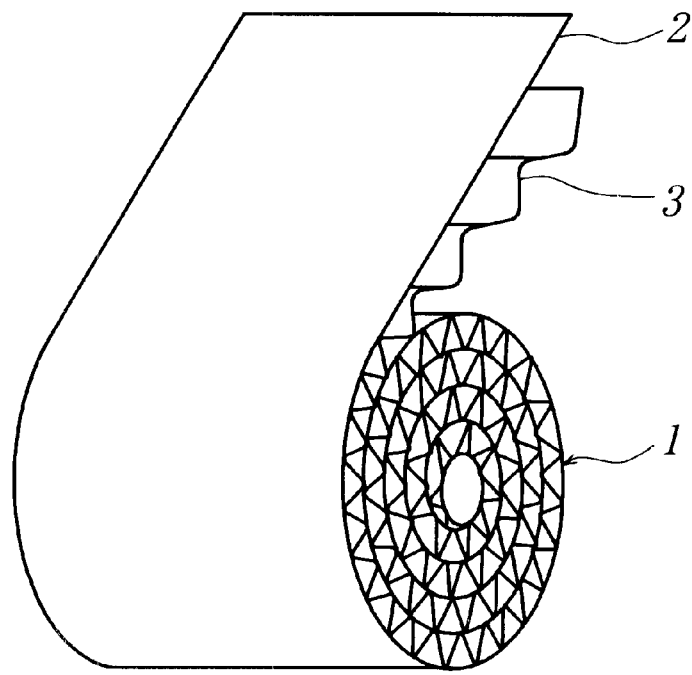
FIG. 1 is a perspective view showing a conventional metal carrier of exhaust gas purifying catalyst, in a state in the course of manufacture.
Figure 2:
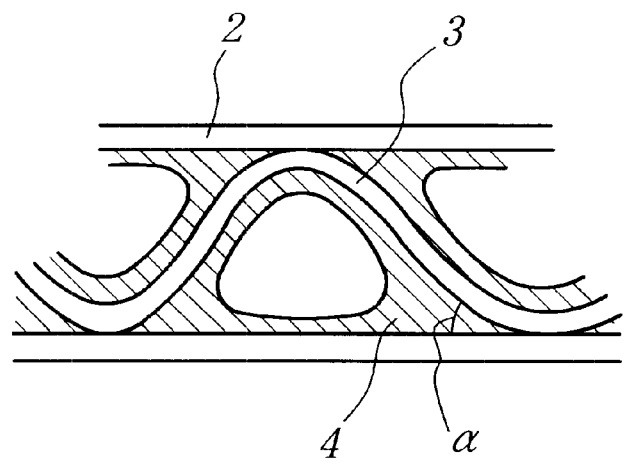
FIG. 2 is a longitudinally and partially sectioned front view showing a state, viewed from a direction of exhaust gas flow, in which wash coat is applied onto a conventional metal carrier for an exhaust gas purifying catalyst manufactured by the conventional method, and catalyst is carried thereon.
Figure 3:
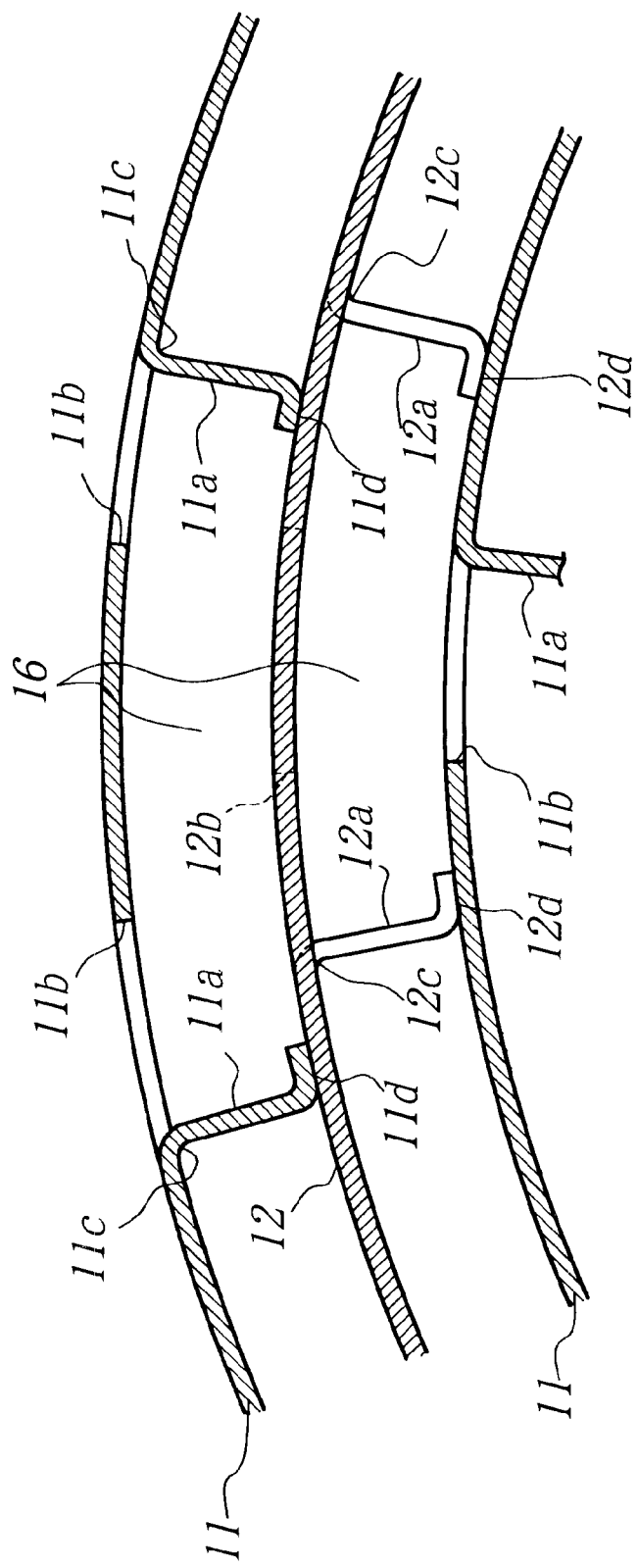
FIG. 3 is a longitudinally and partially sectioned front view showing, viewed from a direction of exhaust gas flow, a metal carrier for an exhaust gas purifying catalyst manufactured by a manufacturing method according to one embodiment of the present invention.

Referring now to FIG. 3, there is sectionally shown only a part of metal carrier of exhaust gas purifying catalyst manufactured by a manufacturing method according to one embodiment of the present invention, comprising two or more (in FIG. 3, two) sheets of flat metal foils 11, 12 formed with projections 11a, 12a projecting to one sides of the flat metal foils 11, 12, respectively.

Figure 4:
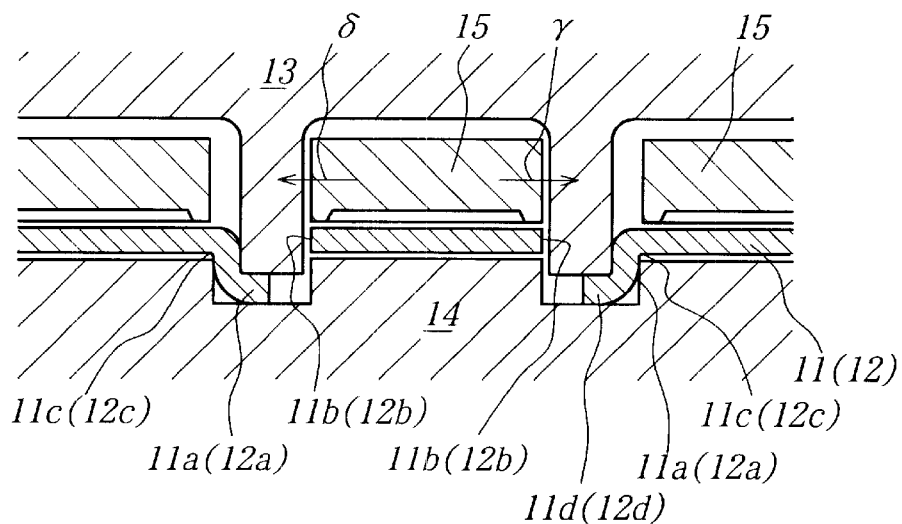
FIG. 4 is a detailed sectional view showing a worked state of a flat metal foil to be used upon manufacturing the catalyst carrier shown in FIG. 3.
Figure 5:
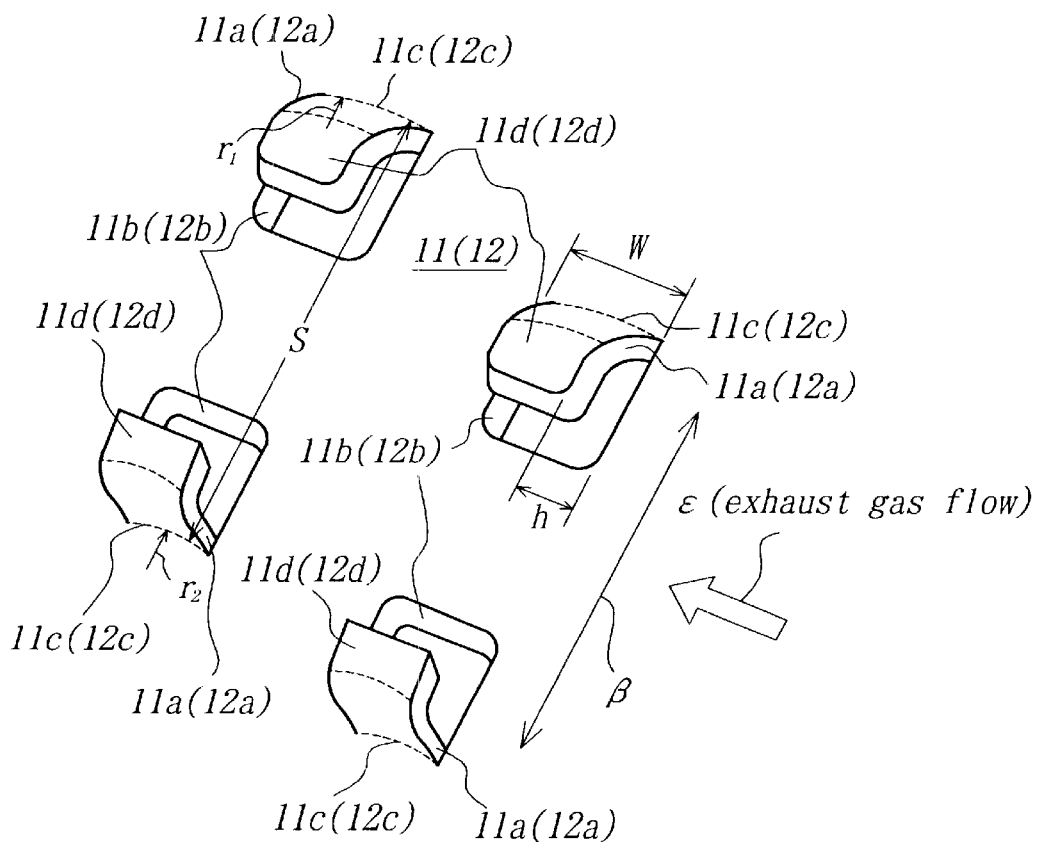
FIG. 5 is a perspective view showing a configuration after working of the flat metal foil.

As shown in FIG. 4, these projections 11a, 12a are stampingly formed by a punch 13 and a die 14 into a shape as clearly shown in FIG. 5, and simultaneously therewith, holes 11b, 12b are formed in the flat metal foils 11, 12.

It is noted that, this stamping shall be performed under a condition that the punch 13 stamps the flat metal foil 11 or 12 fixed between a pressing plate 15 and the die 14, to thereby avoid occurrence of wrinkles in the flat metal foils 11, 12.

Stamping shape is not limited to a rectangle as clearly shown in FIG. 5, and may include arbitrary ones such as elliptical, semi-circular, and triangular. Anyway, the shape of punch 13 is selected so that the projections 11a, 12a are connected with the flat metal foils 11, 12, respectively, without shearing the portions 11c, 12c from the flat metal foils 11, 12, respectively.

If the projections 11a, 12a and holes 11b, 12b are formed by stamping the flat foils 11, 12 simultaneously in such a manner, it becomes possible not only to shorten the machining time for them but also to readily form the projections 11a, 12a and holes 11b, 12b without inducing weight increase and cost increase because the projections 11a, 12a are stamped portions of the flat metal foils 11, 12, respectively.

It is noted that the tip ends 11d, 12d of projections 11a, 12a are bent parallelly to the planes of flat metal foils 11,12 upon forming of projections 11a, 12a by means of the punch 13, die 14 and pressing plate 15, and the depth of punch holes of the die 14 shall be determined such that the distance form the planes of flat metal foils 11, 12 up to the tip ends 11d, 12d, i.e., height h (FIG. 5) of projections 11a, 12a corresponds to a required space between flat metal foils 11, 12 as shown in FIG. 3 by the same numerals.

Meanwhile, as clearly shown in FIG. 5, the projections 11a, 12a and holes 11b, 12b are aligned and evenly arranged in a longitudinal direction (β) of the flat metal foils 11, 12, respectively, which are necessarily of strip shapes.

Concerning those pairs of projections 11a, 12a and holes 11b, 12b in the same row, the positions of unsheared portions 11c and 12c are set at mutually farther side positions of the holes 11b and 12b, respectively.

In this case, during stamping of projections 11a, 12a shown in FIG. 4, lateral forces δ and γ acting on the punch 13 are compensated with each other, so that the punch 13 is not acted by any lateral forces. Thus, lateral slips of punch 13 are never caused, to thereby avoid deterioration of shearing stamping ability due to deviation of clearance.

As the flat metal foils 11, 12, it is practical to use an as-cold-rolled material, from the viewpoint of cost, so that the flat metal foils 11, 12 have higher rigidity.

As such, it may be difficult to maintain the aforementioned predetermined projection height h, where the projections 11a, 12a cause spring back after formation of projections 11a, 12a by stamping the flat metal foils 11, 12 in the aforementioned manner.

To avoid such a situation, it is desirable not only to consider such as clearance between punch 13 and die 14, and a radius of die shoulder of the unsheared portion, but also to set the unsheared portions not to be a linear shape but to be a curved shape having a radius of curvature toward either side such as shown by r1 or r2 in FIG. 5.

Here, it has been confirmed that the radii of curvature r1, r2 are effective between 0.7 w and 50 w in either case, where a width of unsheared portion is supposed to be w.

To effectively perform the stamping of the projections 11a, 12a, it is desirable to stamp them at once by the punch 13, die 14 and pressing plate 15 shown in FIG. 4, which members are constituted correspondingly to those projections 11a, 12a arranged within an area which is represented by a product of an entire width of flat metal foils 11, 12 and an appropriate length L in the longitudinal direction (β).

Particularly, the relative positions of vertically paired punch 13 and die 14 are required to be firmly fixed to perform the shearing with an appropriate clearance therebetween. As such, punch 13 and die 14 shall be allowed with a piston movement only in a vertical direction, with restricting horizontal movement thereof by a plurality of guide pins. By one stroke of the punch 13, there is machined the amount corresponding to the length L, then the flat metal foils 11, 12 are advanced by identical distances, respectively, and this operation is repeated to thereby form the projections 11a, 12a and holes 11b, 12b corresponding to the foils.

The flat metal foils 11, 12, which have been formed with the projections 11a, 12a and holes 11b, 12b, respectively, in the aforementioned manner, are overlapped with each other such that the respective projections 11a, 12a contact with smooth surfaces (where no projection 12a, 11a protrude) of neighboring flat metal foils 12, 11. Further, these strip like flat metal foils 11, 12 are spirally wound in such an overlapped condition, such that the projections 11a, 12a come to the interior side as shown in FIG. 3. By joining the bent tip ends 11d, 12d of projections 11a, 12a to the smooth surfaces of corresponding flat metal foils 12, 11 such as by brazing, respectively, there is manufactured a cylindrical metal carrier to be used for exhaust gas purifying catalyst.

Here, the reason, why the mutually overlapped strip like flat metal foils 11, 12, are spirally wound in such a direction that the projections 11a, 12a come to the interior side, is to avoid such a situation that the projections 11a, 12a project at an outermost peripheral surface of the cylindrical metal carrier, and to enable strong winding of the flat metal foils 11, 12 with applying pressure in a radially inward direction in order to make a neat contact between the bend tip ends 11d, 12d of projections 11a, 12a and the smooth surfaces of corresponding flat metal foils 12, 11 during winding work.

As shown in FIG. 3, in the carrier of exhaust gas purifying catalyst manufactured by the aforementioned method, there are defined exhaust gas passages 16 between the flat metal foils 11, 12 neighboring in a radial direction with a spacing h defined by projections 11a, 12a.

And there is manufactured an exhaust gas purifying catalyst, by immersingly applying a wash coat liquid (not shown) onto the surfaces in the exhaust gas passage 16, drying it, and then rendering the surface of this wash coat liquid to carry catalyst.

Meanwhile, the exhaust gas passage 16 is defined between flat metal foils 11, 12 neighboring in the radial direction with the spacing h being defined by the projections 11a, 12a. As such, there can be manufactured a carrier of exhaust gas purifying catalyst: in which the exhaust gas passage 16 has a cross sectional shape resembling a rectangle as clearly shown in FIG. 3; in which the rectangle is allowed to have an aspect ratio of about 4 or more by which the fastest temperature elevation of catalyst as aforementioned can be expected, since the height h of projections 11a, 12a can be arbitrarily selected; and by which there is effectively promoted temperature elevation of catalyst after starting of engine.

Further, in the carrier of exhaust gas purifying catalyst as manufactured in the aforementioned manner, the exhaust gas passages 16 are defined in the aforementioned manner, so that the projections 11a, 12a only serve to define the spacing h between the flat metal foils 11, 12, and the protruding angles of projections relative to the flat metal foils 11, 12 can be arbitrarily set.

Therefor, without any burden, it becomes possible to avoid occurrence of a surface intersecting with an inner surface of exhaust gas passage 16 at an acute angle. Thus, it becomes possible to avoid such a problem that an unnecessarily large amount of wash coat liquid is coated onto a particular portion due to a surface tension, at the time of application of wash coat liquid onto an inner surface of the exhaust gas passage 16.

In this way, it becomes also possible to avoid cost increase due to adhesion of an excessive amount of wash coat liquid, and to avoid such a problem that deterioration of catalyst reaction efficiency due to reduction of catalyst carrying surface area leads to lengthen the exhaust gas purifying catalyst unnecessarily long.

In addition, there is not caused increase of heat capacity due to adhesion of excessive amount of wash coat liquid, so that there is not required a prolonged period of time for temperature rise up to the activating temperature of exhaust gas purifying catalyst after starting of engine. Further, there can be also avoided such a problem that the temperature rise of wall surface of exhaust gas passage just after starting of engine is delayed so that unpurified harmful substance continues to outflow.

In the carrier of exhaust gas purifying catalyst as manufactured in the above manner, the holes 11b, 12b exist over entire surfaces of the flat metal foils 11, 12, thereby enabling diffusion of exhaust gas in a radial direction from a carrier center portion where a flow rate of exhaust gas becomes large toward a carrier peripheral portion where a flow rate of exhaust gas becomes small. Thus, at the carrier peripheral portion where the temperature rise tends to delay, there is promoted the temperature rise to thereby enhance an exhaust gas purifying efficiency.

As apparent from the aforementioned description, the projections 11a, 12a give a resistance against an exhaust gas flow $\epsilon$ (see FIG. 5) to thereby cause pressure loss accompanied by a deterioration of engine performance. Thus, it is most preferable to form the projections 11a, 12a in such a configuration that the unsheared portions 11c, 12c connecting the projections 11a, 12a to the flat metal foils 11, 12 are extended in a direction parallel to an exhaust gas flow, i.e., parallel to an axis of the catalyst carrier.

Here, the unsheared portions 11c, 12c also relate to the aforementioned spiral winding operation of the flat metal foils 11, 12, in which the winding axis extends in a width direction of the flat metal foils 11, 12. As such, also in this meaning, it is most preferable to form the projections 11a, 12a in such a configuration that the unsheared portions 11c, 12c are extended in a direction parallel to an axis of the catalyst carrier.

Only, it has been confirmed that, if the inclination of unsheared portions 11c, 12c relative to the axis of catalyst carrier is within 30°, the projections 11a, 12a do not give a resistance problematic to an exhaust gas flow, and the unsheared portions 11c, 12c do not cause inconvenience to a spiral winding operation of the flat metal foils 11, 12.

As described above, since the projections 11a, 12a give a resistance to the exhaust gas flow $\epsilon$ (see FIG. 5), provision of them at a higher density will cause a problematic deterioration of an engine performance.

However, since the projections 11a, 12a serve to maintain the spacing h at a predetermined value between the flat metal foils 11, 12, the provision density can not be reduced so much.

To simultaneously satisfy such two contradicting demands, it is necessary to coordinate an install span S (see FIG. 5) of projections 11a, 12a in the longitudinal direction of the flat metal foils 11, 12 with an aligning degree of projections 11a, 12a in the width direction of the flat metal foils 11, 12. As to the install span of the projections 11a, 12a, it has been confirmed to be advisable to set the span at two to twenty times the height h of the projections 11a, 12a.

Here, considering an operation for forming the projections 11a, 12a and holes 11b, 12b in the flat metal foils 11, 12, they are to be continuously formed by stamping with the strip like flat metal foils 11, 12 being advanced in the longitudinal direction of themselves. As a result, the projections 11a, 12a and holes 11b, 12b are formed in a repeated pattern at a cycle of a certain length, L, corresponding to a longitudinal dimension of a mold.

As such, when the flat metal foils 11, 12 formed with the projections 11a, 12a and holes 11b, 12b in the aforementioned manner are spirally wound, the projections 11a, 12a may align with the holes 11b, 12b, respectively. At this time, the projections 11a, 12a will enter the holes 11b, 12b, resulting in failure of their inherent function to maintain the spacing h between mutually neighboring flat metal foils 11, 12.

To avoid such a harmful effect, it is advisable to vary a cycle of repeated pattern of the projections 11a, 12a and holes 11b, 12b between flat metal foils 11, 12 to be overlapped with each other.

Concerning the number of sheets of flat metal foils 11, 12 to be mutually overlapped, it has been confirmed that two to four sheets are preferable in order to maintain a productivity of catalyst carrier while satisfying the aforementioned requirements.

Meanwhile, in the aforementioned structure, that the exhaust gas inflow side portion of the catalyst carrier, to which exhaust gas firstly impinges, is exposed to the hottest and fastest exhaust gas, and is of insufficient structural rigidity particularly under an engine driving condition at higher temperature where an exhaust gas temperature exceeds 1,050° C. As such, the flat metal foils 11, 12 at the exhaust gas inflow side portion are vibrated by an exhaust gas flow at a pulsationally varying pressure, and aluminum within steel constituting the flat metal foils 11, 12 will be lost by evaporation. Sooner or later, there is caused a tendency of occurrence of longitudinal crack at an end portion thereof due to corrosion fatigue caused by oxidation of the foils. This phenomenon become significant, particularly when the foils have a thickness of 25 µm or less.

Figure 6:
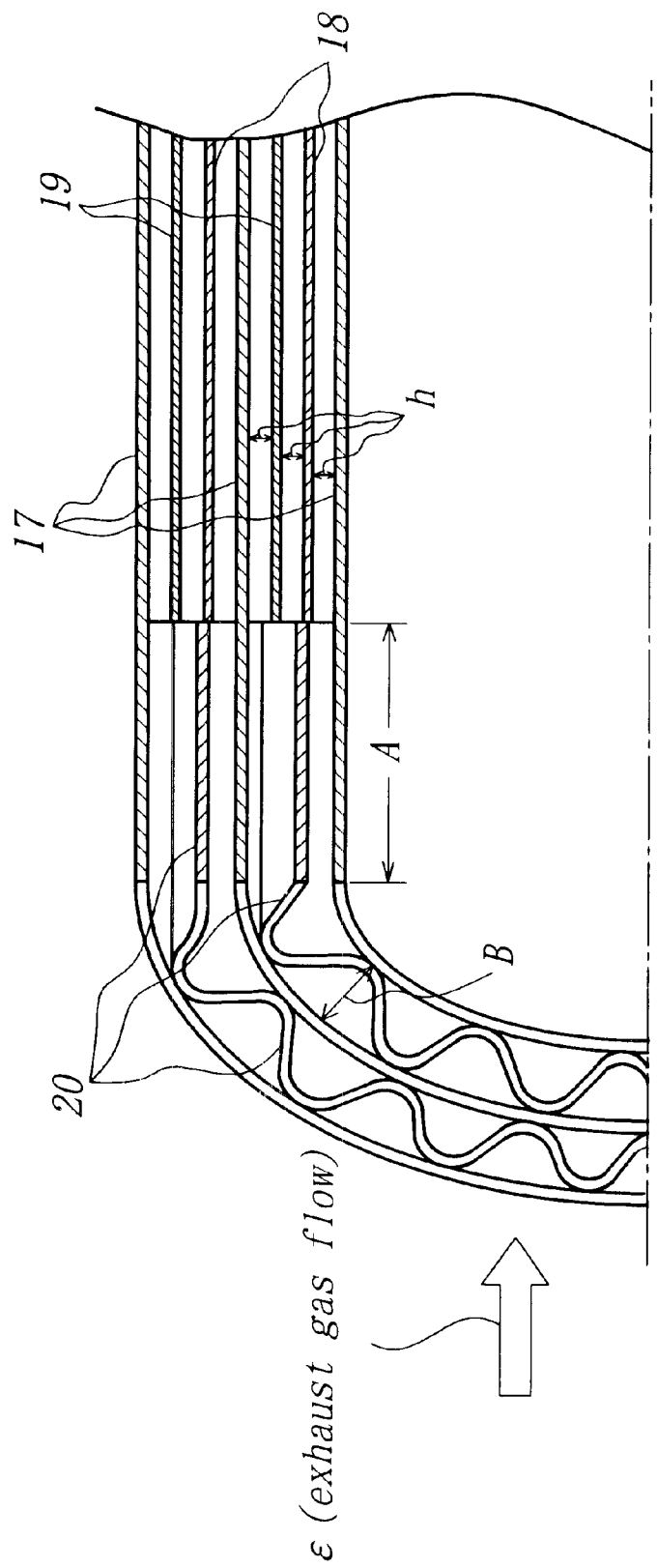
FIG. 6 is a perspective view showing a metal carrier of exhaust gas purifying catalyst manufactured by a manufacturing method according to another embodiment of the present invention, as a partial sectional view.

FIG. 6 shows a metal carrier to be used for an exhaust gas purifying catalyst manufactured according to a method of the present invention, so as to solve the above-mentioned problem. Here, the catalyst carrier is manufactured by spirally winding three sheets of flat metal foils 17, 18, 19 formed to have projections and holes basically identically with the projections 11a, 12a and holes 11b, 12b, and then joining the bent tip ends of applicable projections onto surfaces of corresponding flat metal foils such as brazing.

One flat metal foil 17 of the three flat metal foils 17, 18, 19 has a width identical with an axial length of the metal carrier after its completion. However, at the exhaust gas inflow side portion, all of the remaining flat metal foils 18, 19 have widths shorter than the axial length of the metal carrier after its completion, by a length A.

The one sheet of flat metal foil 17 of wider width is of a flat configuration without the aforementioned projections at its exhaust gas inflow side portion A. It is arbitrary whether the aforementioned holes are formed in the exhaust gas inflow side portion A of a flat configuration.

Wavy foils 20, which have width A just for compensating those exhaust gas inflow side portions of the remaining flat metal foils 18, 19 of narrower width, are overlapped with the flat configuration of exhaust gas inflow side portions A of the wider flat metal foils 17, in advance of the aforementioned spiral winding of the mutually overlapped flat metal foils 17, 18, 19, and the flat metal foils 17, 18, 19 and the wavy foil 20 are spirally wound under the aforementioned mutually overlapped condition; and under this wound condition, the projections of flat metal foils 17, 18, 19 are joined to surfaces of the corresponding flat metal foils such as by brazing, and simultaneously therewith, both sides of top portions of the wavy foil 20 are joined to the exhaust gas inflow side portions A of the flat configurations of the flat metal foils 17 of wider width, such as by brazing, to thereby manufacture the catalyst carrier.

Since the both sides of top portions of the wavy foil 20 are joined to the exhaust gas inflow side portions A of the flat configurations of the wider width flat metal foils 17, it is required that the amplitude B of the wavy foils 20 are set to be a multiplied value of the number n of sheets of flat metal foils 17, 18, 19 (n=3 in FIG. 6) and the height h of projections [the integrated value B=n×h].

The amplitude B of the wavy foil 20 relates to a cross sectional area of an exhaust gas passage at the exhaust gas inflow side portion A. Thus, as the number n of sheets of the flat metal foils is increased, the cross sectional area of the exhaust gas passage at the exhaust gas inflow side portion A is increased to thereby reduce the resistance against an exhaust gas flow. However, when the number n of sheets of flat metal foils is 5 or more, the spiral winding operation becomes difficult, and there can not be expected a predetermined exhaust gas purifying performance due to an excessively large cross sectional area of exhaust gas passage. Also in this meaning, it has been confirmed that the number n of sheets of flat metal foils is suitably two to four, as described above.

In the exhaust gas purifying catalyst manufactured by the aforementioned method, the radially opposing portions are interconnected with each other at the exhaust gas inflow side portion A in a honeycomb configuration by the wavy foils 20, instead of the aforementioned projections, so that the rigidity of the catalyst carrier at the exhaust gas inflow side portion A can be enhanced. Thus, even when the exhaust gas inflow side portion A is exposed to a faster exhaust gas which is hottest and has a pulsationally varying pressure, the aforementioned longitudinal crack will not occur.

It is noted that the width of the exhaust gas inflow side portion A for interconnecting the radially opposing portions of the flat metal foils 17, is preferably in a range between 5 mm and 40 mm. The reason thereof is as follows.

Namely, if the width of the exhaust gas inflow side portion A is less than 5 mm, enfolding operation of the wavy foils 20 becomes difficult thereby the workability reduces. Thus, it is necessary to set the lower limit of the width of the exhaust gas inflow side portion A to be 5 mm. Further, if the width of the exhaust gas inflow side portion A is more than 40 mm, there can not be expected the aforementioned improvement effect of the catalyst performance by flat metal foils 18, 19 of narrower width. Thus, it is necessary to set the upper limit of the width of the exhaust gas inflow side portion A to be 40 mm.

It goes without saying that, as a blank material for the flat metal foils 11, 12, 17, 18, 19 and wavy foil 20, there can be of course utilized a heat-resistant stainless steel commonly used at present, as well as other metal having heat resistance and plastic workability.

[Embodiments]

(1) Embodiment 1

As the flat metal foils, there were prepared two sheets of flat metal foils made of heat-resistant ferritic stainless steel including 20% Cr and 5% Al and having a thickness of 40 µm and a width of 120 mm. These foils were then simultaneously formed with rectangle projections and holes, by means of punch and die.

The unsheared portions connecting the flat metal foil and projections were inclined to an axis of the catalyst carrier at an angle within 25°, and the dimensions of projections and holes were settled as follows:

Height h of projection: 0.8 mm,
Length of hole in a longitudinal direction of foil: 1.5 mm,
Length W of hole in a width direction of foil: 3 mm, and
Width of tip end of projection: 0.4 mm.

Arrangement of projections on the flat metal foil was such that the spacing between projections in the foil width direction is 10 mm, and the spacing between projections in the foil longitudinal direction is 5 mm (ratio of projection height and projection spacing is 6.2).

One flat metal foil was stamped such that a center of a first projection raw comes to a position at 3 mm from an exhaust gas outflow side end. Another flat metal foil was stamped such that a center of a first projection raw comes to a position at 6 mm from an exhaust gas outflow side end.

Upon this machining, there was used a pair of molds having a width of 130 mm and a length of 110 mm, and installed with a punch, die and wrinkle suppressing plate for machining 240 pieces of projections corresponding to an area of an entire width of flat metal foil×foil length 100 mm.

The die side mold was attached with guide pins at four corners. Holes corresponding to the guide pins were bored in an upper mold provided with the punch, and in the wrinkle suppressing plate, and these mold and plate were combinedly provided for stamping the projections and holes.

As shown in FIG. 5, those projections aligned in the longitudinal direction of the flat metal foil were arranged such that paired neighboring projections oppose to each other, i.e., face alternatingly opposing directions to each other, to thereby reduce a lateral force acting onto the molds at stamping up to 0 (zero) or minimum.

Paired two sheets of above machined flat metal foils formed with projections and holes were mutually overlapped, and under this overlapping condition, the flat metal foils were wound under a back tension of 2 kgf into a cylindrical shape having a diameter of 100 mm. This cylinder was put into an outer casing having a thickness of 0.8 mm (and weight of 196 g).

Here, the two sheets of flat metal foils have projections having positions differed from each other in the width direction, so that projections and holes of neighboring foils will be never overlapped.

By adhering brazing agent at contacting points between projections and flat metal foils of the cylindrical body, by putting the cylindrical body into a vacuum heating furnace, and by vacuum heating it under a condition of $10^{-4}$ Torr and 1,150° C. for 90 minutes, the contact points were brazed to thereby form a metal carrier.

(2) Embodiment 2

There was used a stainless foil identical with the Embodiment 1. By stamping, there were formed projections and holes having dimensions and arranging pattern identical with the Embodiment 1, in a width of 90 mm from an edge corresponding to an exhaust gas outflow side of the flat metal foil strip.

At this time, those forming surfaces of the punch and die for stamping the unsheared portions were rendered to have convex curvatures having a radius of 5 mm(radius of curvature /w=1.67), so as to reduce spring back of stampingly formed projections so that the height of projections is stably kept at 0.8 mm.

There were prepared two sheets of flat metal foils, one of which had a thickness of 40 μm and a width of 120 mm, and the other had a thickness of 20 μm and a width of 90 mm, and these foils were spirally wound by mutually matching their edges corresponding to the exhaust gas outflow side.

At the exhaust gas inflow side portion of the 90 mm width flat metal foil, there was arranged a wavy foil strip having a thickness of 40 μm and a width of 25 mm in a wavy form having an amplitude of about 1.8 mm and a pitch of 2.4 mm. This wavy foil strip was spirally wound together with the aforementioned flat metal foils, to thereby form a honeycomb structure at the exhaust gas inflow side portion, in which the wavy metal foil and the flat metal foil of wider width (120 mm width) and 40 μm thickness contact with each other.

At this time, close contact between foils were ensured, not by applying a back tension, but by winding cylindrical carrier while pressing three rolls to the cylindrical carrier by air pressure from the surrounding three directions of the winder.

There was formed a cylindrical body having a diameter of 100 mm by the winder, and this was put into the outer casing identical with the above. However, without using a brazing agent, the cylindrical body was put into the vacuum heating furnace, followed by heating at 1,220° C. to thereby diffusion bond respective contacting points.

(3) Embodiment 3

There was used a stainless foil identical with the Embodiment 1. By stamping, there were formed projections and holes having dimensions and arranging pattern identical with the Embodiment 1, in a width of 110 mm from an edge corresponding to an exhaust gas outflow side of the flat metal foil strip.

At this time, those forming surfaces of the punch and die for stamping the unsheared portions of the stampingly formed projections were rendered to have concave curvatures having a radius of 60 mm(radius of curvature /w=20), so as to reduce spring back of stampingly formed projections so that the height of projections is stably kept at 0.8 mm.

There were prepared three sheets of flat metal foils, one of which had a thickness of 40 μm and a width of 120 mm, and the others had a thickness of 25 μm and a width of 110 mm, and these foils were spirally wound by mutually matching their edges corresponding to the exhaust gas outflow side. At the exhaust gas inflow side portions of the flat metal foils of the narrower width, there was arranged a wavy foil strip having a thickness of 40 μm and a width of 8 mm in a wavy form having an amplitude of about 2.6 mm and a pitch of 3.2 mm. This wavy foil strip was spirally wound together with the aforementioned three flat metal foils, to thereby form a honeycomb structure at the exhaust gas inflow side portion, in which the wavy metal foil and the flat metal foil of wider width contact with each other at the exhaust gas inflow side end.

At this time, adhesion between foils were ensured, not by applying a back tension, but by winding cylindrical carrier while pressing the three rolls to the cylindrical carrier by air pressure from the surrounding three directions of the winder.

There was formed a cylindrical body having a diameter of 100 mm by the winder, and this was put into the outer casing identical with the above. However, without using a brazing agent, the cylindrical body was put into the vacuum heating furnace, followed by heating at 1,220° C. to thereby diffusion bond respective contacting points.

(4) Conventional Example 1

Identically with the Embodiment 1, there were used two sheets of foils made of stainless steel having a thickness of 40 μm and a width of 120 mm, one of which was used as a flat metal foil and the other was formed into a wavy metal foil having a pitch of 2.5 mm and a height of 1.25 mm.

These flat metal foil and wavy metal foil were alternatively wound under a back tension of 2 kgf, into a form of cylindrical body having a diameter of 100 mm. This cylindrical body was put into an outer casing having a thickness of 0.8 mm, to thereby manufacture a catalyst carrier under process and condition identical with those of the Embodiment 1.

(5) Conventional Example 2

Except for using a stainless flat metal foil having a thickness of 25 μm, there was manufactured a catalyst carrier, under conditions identical with the conventional Example 1.

There were weighed the metal carriers as manufactured by the respective embodiments and the conventional examples. Table 1 shows As weights of honeycomb portions which are obtained by subtracting the outer casing portion (196 g) from the weights.

Next, there were weighed the metal carriers after adding thereto wash coat liquid and catalyst, to thereby calculate an added amount of the wash coat liquid.

Thereafter, each of the established catalysts was mounted onto an engine, and the respective results of purifying states for CO gas is shown in Table 1 by comparison of light off time (period of time required for reaching 50% CO purification).

It is noted that the used engine had a displacement of 2,000 CC of four-cylinder type, and the measured results are related to a period from a stopped state up to 2,000 rpm.

TABLE 1

|  | Weight of Metal Part (g) (honeycomb part) | Weight of Wash Coat Liquid (g) | Light Off Time (second) |
| --- | --- | --- | --- |
| Embodiment 1 | 350 | 101 | 8 |
| Embodiment 2 | 295 | 105 | 7.1 |
| Embodiment 3 | 266 | 103 | 6.8 |
| Conventional Example 1 | 570 | 120 | 12.3 |
| Conventional Example 2 | 360 | 128 | 9.3 |

Next, in order to compare durability of catalyst carriers under a severe condition, there were selected the carrier manufactured by the Embodiment 2 and those manufactured by the Conventional examples 1, 2. Each of these carriers was attached to a position at a distance of 40 cm from an exhaust gas outlet side of engine, to thereby conduct an endurance test.

Using engine identical with the above, each carrier was observed after conducting an endurance test in which the engine was rapidly started from a stopped condition up to 5,000 rpm rotation, kept driven at this condition for 10 minutes followed by a rest of 5 minutes, and this cycle was repeated over 800 times.

There were no problems in the Embodiment 2 and the conventional example 1, each of which had a thickened foil at an exhaust gas inflow side to be exposed to the hottest exhaust gas temperature. However, the edge portion was cracked and chipped, in the conventional example 2 having a smaller thickness of foil at the exhaust gas inflow side.

According to the observation, it was assumed that the end portion was chipped due to oxidation of evaporation of Al.

As apparent from the above, in the metal carrier manufactured by spirally winding only flat metal foils having projections and holes over entire surface under a limitation of the number of sheets of foils between two and four, the weight of metal portion can be reduced, and the wash coat liquid is adhered without overcoating to thereby also reduce weight. As a result, the heat capacity of the entire metal carrier is reduced, thereby enabling realization of substantial shortening of light off time.

Further, when the carrier is manufactured according to the Embodiment 2 such that, except for one of flat metal foils to be overlapped, the remaining flat metal foils are rendered to have narrower width, and such that the wavy metal foil having a width corresponding to the width difference between such flat metal foils is incorporated into a portion corresponding to the exhaust gas inflow side, the rigidity of the carrier at the exhaust gas inflow side is increased. By increasing the thickness of the wavy metal foil and the aforementioned one flat metal foil, there can be manufactured a carrier of light weight and excellent light off characteristic while maintaining thermal durability of the carrier.

What is claimed is:

1. A method for manufacturing a metal carrier usable for an exhaust gas purifying catalyst, by spirally winding a blank material into the form of metal carrier, comprising the steps of:

providing two to four sheets of flat metal foils having projections and holes over entire surfaces thereof, as the metal carrier blank material;

spirally winding said flat metal foils under a mutually overlapped state, into a form of cylindrical body; and joining tip ends of said projections to corresponding surfaces of said flat metal foils.

2. A method according to claim 1, wherein said tip ends of said projections of said flat metal foils are bent to run along surfaces of said flat metal foils to which said tip ends of said projections are joined, and said projections are joined to said flat metal foils at said bent tip ends.

3. A method according to claim 1, wherein width of one flat metal foil of said two to four sheets of flat metal foils is rendered to be identical with an axial length of said metal carrier after completion, width of the remaining flat metal foils is rendered to be shorter by a range between 5 mm and 40 mm at an exhaust gas inflow side portion of said metal carrier after completion than the axial length of said metal carrier after completion, and the exhaust gas inflow side portion of said one sheet of flat metal foil in the above range is rendered to be a flat shape where no projections exist, a wavy metal foil having a width just for compensating the exhaust gas inflow side portions of said remaining flat metal foils, is overlapped with said exhaust gas inflow side portion of said one sheet of flat metal foil, and said spirally winding is performed under this state, and under this wound state, both sides of top portions of said wavy metal foil are joined to corresponding surfaces of said one sheet of flat metal foil.

4. A method for according to claim 1, wherein said holes are formed by stamping said flat metal foils, and simultaneously therewith, those stamped and unsheared pieces protruded from said flat metal foils by said stamping are rendered to be said projections.

5. A method according to claim 4, wherein said stamping is performed by a punch after fixing a flat metal foil between a pressing plate and said die.

6. A method according to claim 4, wherein said projections are formed such that the merging portions between said projections and said flat metal foils are directed in a direction parallel to an axis of said metal carrier after completion or inclined within an inclination angle of 30°.

7. A method for according to claim 4, wherein said projections are formed such that said merging portions between said projections and said flat metal foils are curved at a radius of curvature which is 0.7 to 50 times a length of each of said merging portions.

8. A method according to claim 4, wherein those paired projections and holes in the same raw aligning in a winding direction of said flat metal foils are formed such that the positions of merging portions between said projections and said flat metal foils are set at mutually farther hole side positions of the holes.

9. A method according to claim 4, wherein said projections and holes are formed such that arranging patterns of said projections and holes are different from each other between neighboring flat metal foils.

10. A method for manufacturing a metal carrier usable for an exhaust gas purifying catalyst, comprising the steps of:

providing at least two flat metal foil sheets, each sheet having a back side and a front side, said front side having projections and holes in its entirety, said projections having tip ends;

stacking the metal foil sheets, wherein the tip ends of the projections of one metal foil sheet contact the back side of an adjacent metal foil sheet;

winding the stack in a spiral; and adhering the tip ends of the projections to the back side of the adjacent metal foil sheet, wherein inside surfaces of the wound metal foil sheets are used for supporting an exhaust gas purifying catalyst thereon.

* * * * *